United States Patent [19]
Fowlie et al.

[11] 3,840,222
[45] Oct. 8, 1974

[54] DOCUMENT FEEDER FOR ELECTROSTATIC COPIER

[75] Inventors: Wallace R. Fowlie, Riverside; Moo S. Yoon, Glenview, both of Ill.

[73] Assignee: A. B. Dick Company, Niles, Ill.

[22] Filed: Apr. 9, 1973

[21] Appl. No.: 349,086

Related U.S. Application Data
[62] Division of Ser. No. 226,872, Feb. 16, 1972, Pat. No. 3,762,813.

[52] U.S. Cl.......................... 271/4, 271/80, 271/186
[51] Int. Cl.............................................. B65h 29/22
[58] Field of Search............ 271/3, 4, 65, 69, 71, 80, 271/86, 87, 51, 185, 186, 207

[56] References Cited
UNITED STATES PATENTS
| | | | |
|---|---|---|---|
| 848,777 | 4/1907 | Smith | 271/213 |
| 3,052,468 | 9/1962 | Cutaia et al. | 271/87 X |
| 3,062,537 | 11/1962 | Hanstein et al. | 271/80 X |
| 3,148,879 | 9/1964 | Kistner | 271/71 X |
| 3,506,257 | 4/1970 | Fackler et al. | 271/10 |
| 3,700,231 | 10/1972 | Aasen et al. | 271/65 |

*Primary Examiner*—Evon C. Blunk
*Assistant Examiner*—Bruce H. Stoner, Jr.
*Attorney, Agent, or Firm*—McDougall, Hersh & Scott

[57] ABSTRACT

A copy machine including means for transporting an original to an exposure location, means for directing an image of the content of the original to a copying location and means for transporting individual copy sheets to the copying location. Switch means are provided for detecting the leading and trailing edges of the original and copy sheets with the sequence of operations being controlled by the condition of these switch means whereby maximum efficiency from the standpoint of feeding of originals and copy sheets can be accomplished. Engagement of switches with leading edges of the originals and copy sheets cooperates with a "ready" position provided for the originals whereby the copy sheets and originals can be moved in synchronism through the respective exposure and copying locations. The mechanisms are arranged so that both originals and copy sheets are obtained in page number sequence after completion of a continuous multiple copy operation whereby restacking of originals or copy sheets to conform to the initial stack of originals is not required. The withdrawal means for moving the originals from the exposure location are designed to achieve the proper restacking.

2 Claims, 4 Drawing Figures

DOCUMENT FEEDER FOR ELECTROSTATIC COPIER

This is a division of application Ser. No. 226,872, filed Feb. 16, 1972 now U.S. Pat. No. 3,762,813.

This invention relates to an improved reproduction machine. The invention is particularly directed to reproduction machines which will efficiently produce copies of a succession of original documents, the copies being formed on individual copy sheets.

Although the features of the invention have application in a variety of reproduction machines, the invention is effectively applied, and will be described with reference to an electrostatic copier. In such copiers, original documents are fed to an exposure location whereby the content of the original will be illuminated. The image of the original is then projected to a copying location, and electrostatic copy paper is provided at this location. Upon developing of the image, a copy of the original is obtained.

It is desirable to provide copying machines of the type described which are capable of handling a plurality of originals with the copying of the originals being carried out automatically. Thus, means are provided for delivering the originals, one at a time, to the exposure location, and means are also provided for presenting a supply of copy paper at the copying location.

The continuous production of copies from a multiplicity of originals leads to certain inefficiencies with existing equipment. For example, existing equipment may provide copy sheets of a given size irrespective of the size of the original. In these instances, particularly if a very short original is involved, a considerable delay will occur to allow for passage of the copy sheet before the next original can be fed. The proposal has been made to provide copy machines with an endless roll of copy paper so that copy sheets of varying sizes can be obtained depending on the size of the original; however, such machines require cut-off means actuated by an original or some other mechanical means.

In addition to the aforementioned matters, the provision of means which will provide stacking of both originals and copy sheets in page number sequence while also providing maximum operating speed and efficiency is also highly desirable. Thus, if either the originals or copy sheets are stacked in an order different than the beginning sequence of the originals, manual or other restacking will be required which is time consuming and otherwise inconvenient. Finally, detecting means which actuate a warning means to indicate that copy paper, and/or originals are exhausted, or that feed mechanisms therefore are malfunctioning, are also desirable from the standpoint of operating efficiency.

It is a general object of this invention to provide an improved copying machine which is capable of automatically producing copies of a multiplicity of originals with a maximum of efficiency.

It is a more particular object of this invention to provide a copying machine which will move originals and copy sheets through respective exposure and copying locations whereby delays occasioned by various lengths of originals and copy paper are eliminated.

It is a further object of this invention to provide a copy machine which includes highly efficient means for obtaining registry between originals and copy sheets as these sheets move toward and through exposure and copying locations.

It is a further object of this invention to provide a copy machine which includes means for detecting depletion of originals and/or copy paper, or for detecting malfunctioning of original and copy paper feeding mechanisms, and which sound an alarm and switch off the machine.

It is a further object of this invention to provide an arrangement of the mechanisms in the copy machine whereby both originals and copy paper are stacked in page number sequence after copying.

These and other objects of this invention will appear hereinafter and for purposes of illustration, but not of limitation, a specific embodiment of the invention is shown in the accompanying drawings in which:

FIG. 1a is a fragmentary elevational view illustrating the withdrawal roll structure of the construction;

Figure 1:
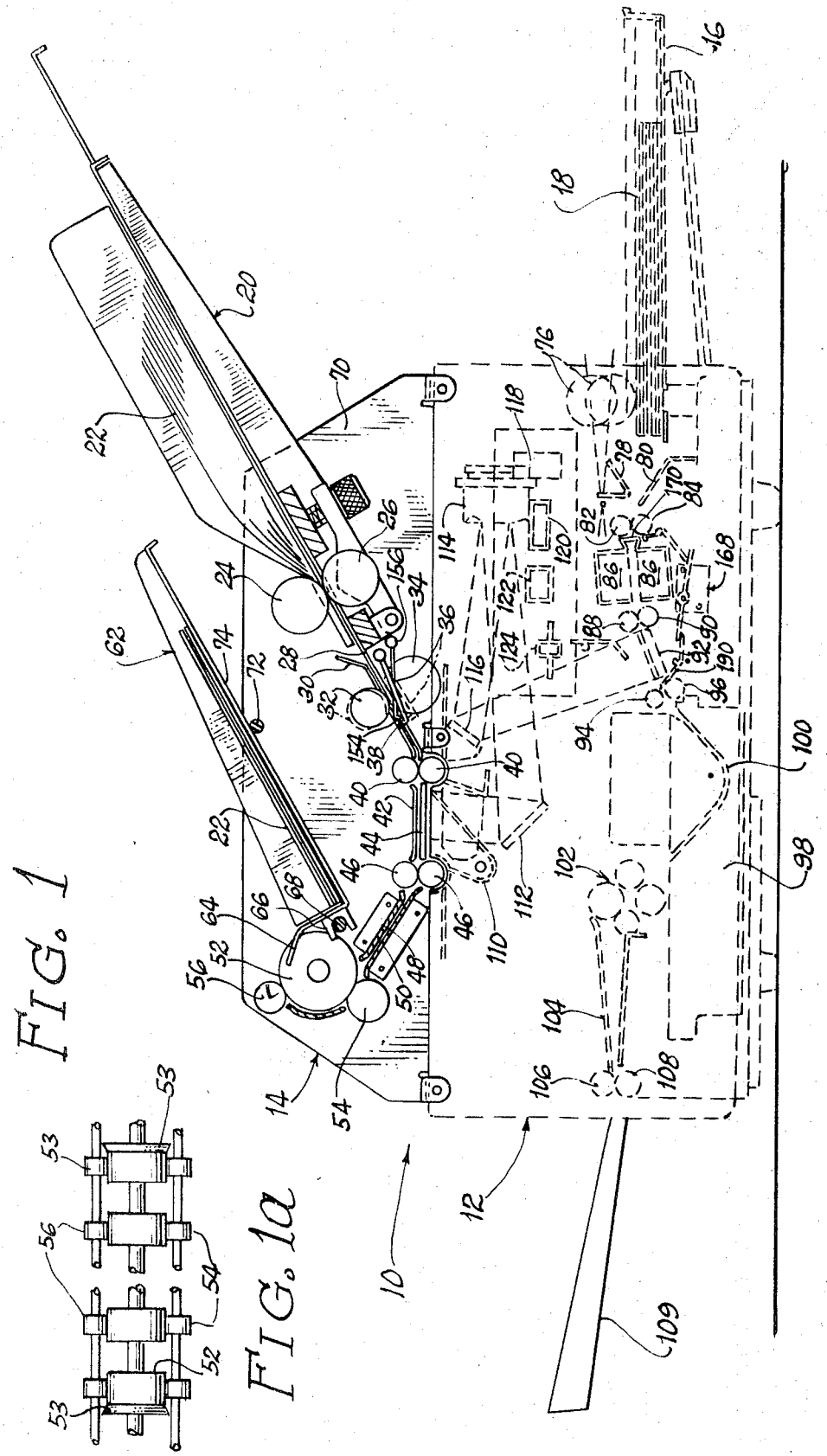
FIG. 1 is a side elevational view of the construction of the invention.

This invention generally relates to a copy machine, such as an electrostatic copier, wherein means are provided for transporting an original to an exposure location. Means are provided for directing an image of the content of originals to a copying location. The copy sheet will comprise an electrophotographic paper in the case of an electrostatic copier and developing means are preferably located within the body of the machine. Machines of this general type are particularly suitable as "desk-top" copiers.

Certain improvements of the invention relate to switch means and associated mechanisms which are located in the path of movement of originals and copy sheets. A two-position switch is preferably located for engagement by the leading and trailing edges of a copy sheet, and another switch is employed for engaging the leading and trailing edges of an original. The sequence of operations from the standpoint of the timing for feeding of originals, and from the standpoint of registry of the copy sheets and originals is controlled by these switch means.

The switch means are connected to means for transporting originals toward the exposure location. The transporting means for the originals up to a "ready position" are actuated when the trailing edges of preceding originals disengage one switch. When the leading edges of succeeding copy sheets arrive at a forward position of a separate switch, which only occurs when an original is at the ready position, then the originals and copy sheets are moved in synchronism for copying purposes. The trailing edges of preceding copy paper must clear a rearward position of the separate switch before this synchronous operation can begin.

The synchronous movement of the originals and copy sheets to exposure position is initiated as soon as the leading edge of a copy paper is moved to engage the forward position of the separate switch. In cases where the original is longer than the copy paper, this movement toward the separate switch is initiated as soon as the original arrives at the ready position. Where the copy paper is longer than the original, the movement of a succeeding copy sheet toward the separate switch is automatically delayed until the trailing edge of the previous copy sheet passes the rearward switch position. The actuation of the original transporting means for moving originals to the ready position is always determined by the trailing edge of the originals.

In constructing copy machines of the type contemplated by the instant invention, an original feeding tray is located at one side of the exposure location with the originals stacked face down. Transporting rolls for moving originals to the exposure location are positioned adjacent this tray and withdrawing rolls for the originals are located on the other side of the exposure location. The withdrawing mechanisms include means for moving originals upwardly from the exposure location into a receiving tray for collecting the originals, this tray being preferably located above the exposure location. The originals are stacked in the receiving tray in the same page number sequence as they were fed into the copy machine. The copy sheets are delivered to a copy receiving tray and stacked in the same page number sequence so that no restacking of originals or copy sheets is required.

FIG. 1 of the drawings illustrates electrostatic copy machine 10 including a lower housing 12 and an upper document feeder assembly 14. A supporting tray 16 is provided for holding a stack of separate copy sheets 18. An original feeding tray 20 is provided for holding a stack of original documents 22.

The original feeding tray is inclined downwardly toward original separator rolls 24 and 26. The roll 24 is a driven roll and the roll 26 is stationary as described in Gallagher U.S. Pat. No. 3,484,099, these rolls operating to move originals, one at a time, from the stack of originals along a supporting surface 28. Each original is fed beneath a guide member 30 to the nip of forwarding rolls 32 and 34.

A pivotally mounted stop member 36 includes an upwardly extending end portion 38 which engages the leading edge of each original. When this stop member is moved to an unblocking position, the feeding rolls 32 and 34 drive the originals between rolls 40 (the upper roll being driven and the lower roll following) and between guide plate 42 and transparent supporting member 44. The originals continue movement between rolls 46 (also comprising a driven and follower roll), between additional guide plates 48 and 50 and then between sets of rolls 52 and 54, and 52 and 56. The originals are finally deposited in an original receiving tray 62.

The originals are stacked in tray 20 with the first page by number on the bottom and the last page on top, all sheets having their content positioned face down. The top sheet or last page is thus copied first and the withdrawing mechanisms locate this sheet in the tray 62 with the content side up. Accordingly, when copying is completed, the top original located in the tray 62 will be page one with the content side up, the stack of originals therefore being in correct page number sequence.

In order to achieve withdrawing and depositing action of the originals, the rolls 52 are driven at a higher peripheral speed than the rolls 46. Initially the rolls 52 slip on the original 22 until the original moves past or clears rolls 46, then the original advancement is taken over by the rolls 52 and the original is accelerated, being brought up to the higher peripheral speed of the rolls 52.

The outer rolls 52 in that set define tapered flange portions 53. For originals of standard 8½ inches width or greater, the edges of the paper will engage the flanges and a "beam" effect is imparted to the paper. This increases the efficiency of movement of the paper from the rolls 52 into the tray 62.

The tray 62 defines a guide member 64 at its receiving end, and an outwardly extending U-shaped bracket 66 is attached at the front of this tray. The bracket opening receives supporting studs 68 which mount on opposed sidewalls 70 of the mechanism. Second supporting studs 72 are positioned for engagement with the bottom walls 74 of the tray. It will be appreciated that with this arrangement, the tray is securely supported but is also very quickly and easily removable by simply pulling the tray upwardly to disengage the bracket 66 and studs 68. Removal of the tray provides access to mechanisms previously described whereby paper jams or other difficulties with these mechanisms can be readily attended to.

The feeding of copy paper 18 is accomplished on a sheet-by-sheet basis by means of a driven roll 76. This roll is pivotally mounted so that it will continuously engage the top copy sheet.

The copy sheets are fed between guide members 78 and 80 to rolls 82 and 84. These rolls direct the copy sheets through an electrostatic charging unit 86, and then to a second set of rolls 88 and 90.

After receiving the electrostatic charge, the copy sheets are moved to the copying location 92 where all images of the content of the originals are directed onto the copy sheets. Rolls 94 and 96 move the copy sheets to a tank 98 which contains a toner solution. Guide mechanism 100 located within the tank directs the copy sheets to roll assembly 102, through guide plates 104, and then to rolls 106 and 108 for discharge of copy sheets from the machine into copy receiving tray 109, the copy sheets being located in the tray in the same page number sequence as the originals.

The image presented to the copy sheets is provided by means of an optical system including light source 110 and reflecting surfaces 112, 114 and 116. Controls for the operation of the construction may be mounted on a side wall of the lower housing 12 and may include an ON-OFF switch actuator 118, a print switch actuator 120, a print light 122 and an exposure control 124. From the standpoint of the electrostatic copying features, such features are known in the art, for example as included in the Model 625 copier produced by the A. B. Dick Company. Reference is also made to Martin U.S. Pat. No. 3,468,605 and Fox, et al. U.S. Pat. No. 3,498,710 for a convenient source of information insofar as the state of the art is concerned.

Figure 2:
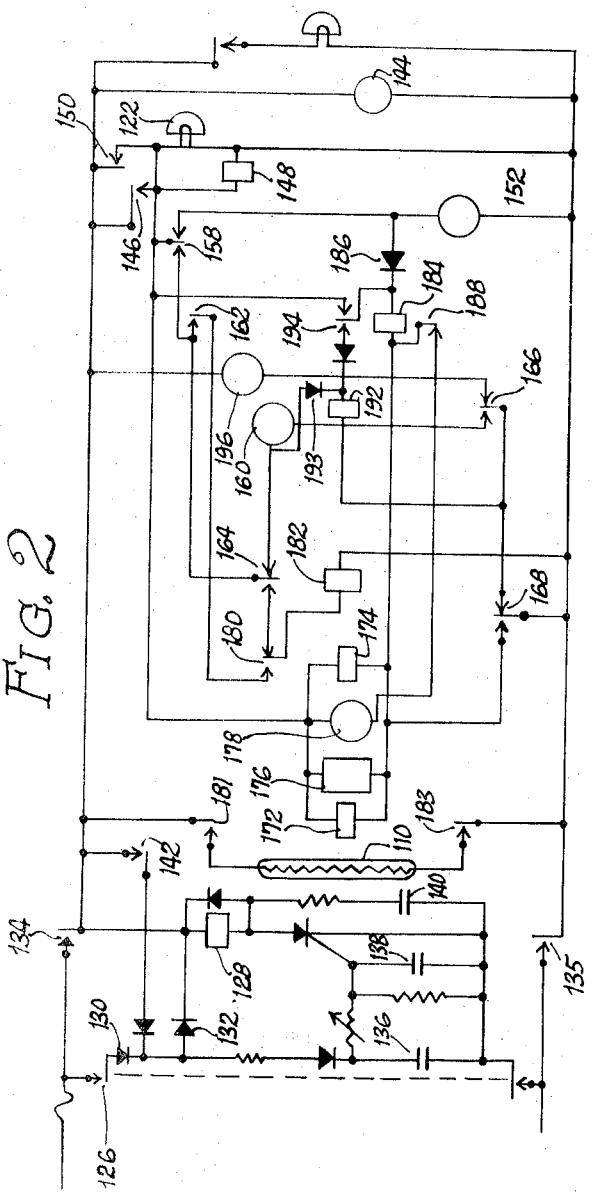
FIG. 2 is a circuit diagram suitable for use in the operation of the construction; and, FIG. 3 comprises a sequence chart illustrating the successive steps in the operation of the invention.
Figure 3:
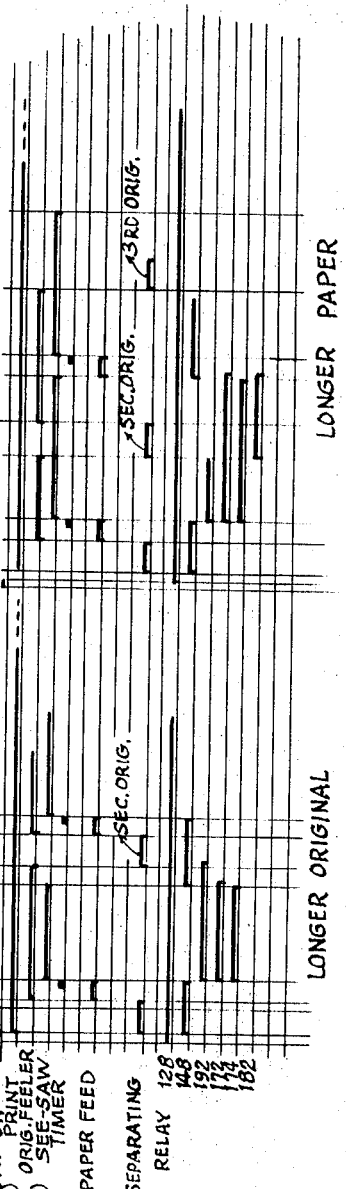

FIGS. 2 and 3 illustrate schematically a circuit diagram and the sequence chart of the type utilized in the practice of the concepts of this invention. The circuit includes a main ON-OFF switch 126 actuated by the switch actuator 118. When this switch is actuated to initiate use of the machine, the switch contacts are momentarily closed which results in operating of relay 128 through diodes 130 and 132. The relay 128 closes switches 134 and 135.

The relay 128 is connected in an automatic shut-off circuit including capacitors 136, 138 and 140. Due to the continual discharge of the capacitors, the relay will remain operative only as long as the charge on the capacitors is sufficient to hold the semi-conductor device conducting. The capacitor circuit is continuously recharged by means of a timer switch 142 which is closed each time a copy is made. In the event that mechanisms are not initiated for making copies, the timer switch 142 will not operate in which case the machine will shut down until the main ON-OFF switch 126 is again actuated. A suitable circuit for achieving this function is described in greater detail in Yoon U.S. Pat. No. 3,611,049.

When the switches 134 and 135 are closed, the motor 144 which is used for operating the various drive rolls in the machine is started. With a stack of originals in the machine, and with copy sheets in place, a printing operation can then begin. Printing is commenced by operation of the print switch actuator which momentarily closes switch 146. This energizes relay 148 which locks in switch 150 to hold the relay. The print light 122 is also turned on.

Closing of switch 150 also energizes original separating magnetic clutch 152. This magnetic clutch engages the separator roll 24 for moving an original 22 toward the stop member 36. This stop member is in the condition shown in FIG. 1 whereby the original will engage the blocking portion 38 of the stop member so that the original cannot move beyond this "ready" position.

An original feeler switch arm 154 is located at this ready position, and this arm is pivotally mounted at 156 whereby the leading edge of an original will depress the arm which leads to operation of switch 158 which therefore moves from the normally closed position illustrated in FIG. 2 to the normally open position. This de-energizes the original separating clutch 152 whereby the feeding action of roller 24 ceases.

Switching of the switch 158 energizes the paper feed solenoid 160 through switches 162 and 164, the connection for this solenoid being completed through switches 166 and 168. The paper feed solenoid controls the operation of a one-turn clutch mechanism for drive roller 76 whereby a copy sheet begins movement toward the electrostatic charging unit 86. The upper rolls 82, 88 and 94, and rolls 102 and 106, are continuously driven so that the copy sheets move forward automatically once the solenoid 160 operates.

The switch 168 comprises a see-saw switch located adjacent the charging station 86. This switch includes a forward or first actuating arm 170 positioned at the entry end of the charging station, and engageable by the leading edge of a copy sheet. When the copy sheet engages this forward arm 170, the switch 168 is moved to the normally open position, thereby de-energizing the paper feed solenoid 160.

The switching of the see-saw switch energizes the relays 172 and 174 and also initiates the high voltage power supply 176 and energizes the original forwarding solenoid 178. Operation of the relay 172 closes switches 180 and 182 for operating light source 110. The high voltage power supply services the charging station 86. The original forwarding solenoid 178 is connected to the pivotally mounted stop member 36 and operates to lower the blocking portion thereof to the dotted line position shown in FIG. 1. The upper forwarding roller 32, a driven roller, is also connected to this solenoid and is lowered thereby for contact with the original at the ready position to thereby drive the original toward the exposure location.

Relay 174 moves switch 180 to the normally open position which operates relay 182 thereby moving switch 164 to the normally open position. As the original passes through the stop position, the original feeler switch actuating member 154 is restored thereby returning the switch 158 to the normally closed position. This de-energizes relay 182 and restores switch 164 to the normally closed position. The original separating solenoid 152 is again energized whereby the next original will move toward the ready position.

When the switch 158 is restored, the relay 184 is energized through diode 186 and switch 168. This relay opens the switch 188 which de-energizes the original forwarding solenoid 178 to raise the stop member 136 to the blocking position. When the leading edge of the next original actuates the original feeler switch 158, the relay 184 is restored whereby the switch 188 closes to prepare the circuit for the next cycle.

The see-saw switch 168 includes a second or rearward portion 190 which is pivotally mounted and spring-urged whereby the see-saw switch is restored when the trailing edge of the copy sheet passes the actuator 190. This de-energizes the relays 174 and 174 and opens the high voltage power supply. This conditions the circuits so that the paper feed solenoid 160 will operate as soon as the trailing edge of the copy sheet passes arm 190, provided that the copy sheet is longer than the original. In that case, the switch 158 will already be restored and the next original will be at the ready position by the time the next copy sheet reaches arm 170 of the see-saw switch. The cycle described repeats until all originals are depleted or until all of the copy paper is depleted.

As noted, the above cycle applies where the copy sheet is, in a given instance, longer than the original. Thus, the trailing edge of the original passes the actuator 154 of feeler switch 158 before the trailing edge of the copy paper passes the rearward portion 190 of the see-saw switch 168. The system of the invention; however, provides a somewhat different operation where the original is longer than the copy sheet thereby increasing the efficiency of the system. Specifically, when the trailing edge of the copy sheet passes the arm 190 of the see-saw switch 168 before the switch 158 is restored, then the relays 172 and 174 and the solenoid 178 are restored, and the high voltage circuit 176 is opened. When relay 174 is de-energized, the switch 180 is restored which momentarily opens the circuit to relay 182. The relay 182 is, however, characterized by a slow-to-release operation so that the relay remains energized through the normally open contact of switch 164 and the normally closed contact of switch 180. This prevents any premature operation of the paper feed solenoid 160.

When the trailing edge of the original passes and the switch 158 is restored, the relay 182 is de-energized and the original separating solenoid 152 operates to deliver the next original. This original will stop in the manner described, and rest until the paper feed solenoid 160 moves a copy sheet into contact with the actuator 170 for see-saw switch 168. It will be appreciated that this operation guarantees synchronism between the leading edges of the original and copy sheet. It will further be understood that by accommodating both longer originals and longer copy sheets, the machine is characterized by a highly desirable versatility while minimizing any loss in efficiency since the accommodation is automatic. This can be of significant advantage, particularly where originals of different sizes are stacked together.

The system provides for automatic shut-off of the machine when either originals or copy sheets are depleted. In a case where originals are first depleted, the original feeler switch 158 will be in the normally closed position. In addition to energizing the original separating solenoid 152 (which operates even though there is no original to separate), the slow-to-operate relay 192 will be energized through diode 186 and switch 194. The relay 192 operates as a time-delay relay which will operate switch 166 after a pre-determined period whereby a buzzer 196 will signal the operator that the original supply has been depleted. This time period is selected so that the next original will operate switch 158 if there is another original. If the originals are depleted, switch 158 will not be moved to the normally open position and the buzzer will sound when relay 192 operates switch 166.

If the supply of copy sheets should be depleted while originals are still available, then switch 158 will move to the normally open position and paper feed solenoid 160 will be operated. Time delay-relay 192 will also be energized through switch 164 and diode 193. If there is no copy sheet available to open see-saw switch 168, the relay 192 will remain energized for a sufficient period to sound the buzzer. Automatic shut-off switches 134 and 135 operate to shut down the machine after the buzzer operates whenever originals or copy paper are depleted, since the timer switch 142 will not be closed. This switch may be operated by any of the various mechanisms that function repetitively in normal copying operations, for example, the relay 172. If desired, the warning buzzer system could be connected only for warning of the depletion of copy sheets, particularly where the original stack can be visually observed.

The described arrangement insures against missing the copying of an original where copy sheets are depleted before the originals. Thus, the last original moved to the ready position by the solenoid 152 will remain in this position until a copy sheet engages switch arm 170. An original cannot move through the exposure position unless a copy sheet is moving synchronously. Although a less serious problem, the design also prevents placement of a blank copy sheet in the stack of copies. Thus, the paper feed solenoid 160 will not operate unless an original has moved to the ready position to actuate switch 158.

The sequence chart provided in FIG. 3 serves to illustrate the differences in operation occasioned by the use of longer originals or longer copy sheets. Numerals corresponding to the elements referred to in the sequence chart are included.

It will be noted that the momentary switch 126 and the print switch 158 operate in the same manner irrespective of the size of the original copy paper. In the case of a longer original, the switch 158 is held in the normally open position for a time exceeding the normally open position of the switch 168. In a case where the copy sheet is longer, the original feeler switch is held down for the length of the original. The see-saw switch 168 is held down for a longer period; however, the next original has already moved into engagement with the switch 158 before the copy sheet passes the see-saw. Accordingly, this original is immediately in position for the feeding of the next copy sheet eliminating any delay. Thus, the second original feeding occasioned by the operation of solenoid 152 takes place irrespective of the length of the copy sheet, and will occur as soon as the switch 158 is released.

It will be understood that various changes and modifications may be made in the above described system which provide the characteristics of this invention without departing from the spirit thereof particularly as defined in the following claims.

That which is claimed:

1. In a copy machine including means for supporting a stack of originals in page number sequence, means for transporting the originals, one at a time, to an exposure location, and means for withdrawing the copy sheet from said exposure location, the improvement wherein said means for transporting the original to the exposure location include sheet separating and feeding means offset laterally to one side of the exposure location, said sheet separating and feeding means operating to automatically move the originals, one at a time, to the exposure location, said means for withdrawing the original being offset laterally to the other side of the exposure location, and said withdrawing means comprising first drive means assisting in moving the originals through the exposure location, and second drive means operating at a higher peripheral speed for engaging the originals after passage from said first drive means, said first and second drive means being spaced so that the originals are simultaneously engaged by both, and wherein the second drive means slip relative to the originals until release of the originals by the first drive means, said second drive means being designed to develop momentum in said originals and having means to project the originals upwardly and then back in a direction toward said sheet separating and feeding means, an inclined receiving tray for said originals located above said exposure location with the lower end of said tray being positioned adjacent to and below the outlet of said second drive means, and with the upper end of said tray being positioned remote from and above the outlet of said second drive means, whereby said originals are in a substantially horizontal position in the plane of said exposure location and whereby the originals must, therefore, be projected vertically and then back into an inclined plane above said tray for movement into said tray, said withdrawing means thereby operating to move said originals upwardly and back for deposit of the originals in the receiving tray in the same sequence as said originals were fed and with the content of each original facing in the same direction relative to other originals as in the original stack of originals.

2. A construction in accordance with claim 1 wherein said tray rests on support means whereby the tray can be lifted for access to the exposure location, said transporting means and withdrawing means being mounted independently of said tray whereby the tray can be lifted from said support means without disturbing the operation of said transporting and withdrawing means.

* * * * *